United States Patent [19]

Heuser et al.

[11] Patent Number: 4,913,866
[45] Date of Patent: Apr. 3, 1990

[54] PROCESS FOR REDUCING FOGGING DUE TO PLASTICIZERS IN PLASTICS

[75] Inventors: Jürgen Heuser, Krefeld; Lothar Meier, Sprockhoevel; Karola Brudermanns, Leverkusen; Otto Billinger, Linz; Rolf Kubens, Odenthal, all of Fed. Rep. of Germany

[73] Assignee: Bayer Aktiengesellschaft, Leverkusen, Fed. Rep. of Germany

[21] Appl. No.: 328,618

[22] Filed: Mar. 27, 1989

[30] Foreign Application Priority Data

Apr. 6, 1988 [DE] Fed. Rep. of Germany ....... 3811449

[51] Int. Cl.$^4$ ...................... B29C 41/18; B29C 43/24; B29C 47/00; C08J 3/00
[52] U.S. Cl. .................................... 264/83; 264/175; 264/211; 264/302; 528/499
[58] Field of Search ................. 264/83, 175, 211, 302; 528/499

[56] References Cited

U.S. PATENT DOCUMENTS

| 3,985,849 | 10/1976 | Notomi et al. | 264/211 X |
| 4,267,145 | 5/1981 | Wysong | 264/211 X |
| 4,315,808 | 2/1982 | Imada et al. | 264/83 X |
| 4,722,816 | 2/1988 | Ueno et al. | 264/83 X |

FOREIGN PATENT DOCUMENTS

| 737929 | 10/1955 | United Kingdom . | |
| 2052525 | 1/1981 | United Kingdom | 264/83 |
| 2118565 | 11/1983 | United Kingdom . | |

Primary Examiner—Jeffery Thurlow
Assistant Examiner—Leo B. Tentoni
Attorney, Agent, or Firm—Connolly and Hutz

[57] ABSTRACT

Fogging of plastics containing polymer plasticizers is reduced by treating the polymer plasticizers with water vapor in the melt.

9 Claims, No Drawings

PROCESS FOR REDUCING FOGGING DUE TO PLASTICIZERS IN PLASTICS

BACKGROUND OF THE INVENTION

The invention relates to a process for reducing fogging due to plasticizers in plastics.

It is known that plasticizers in plastics cause fogging, as can be observed for example on the insides of windows in cars which have interior fittings made of plastic (e.g., dashboards), when they are steamed up.

Polymer plasticizers, e.g. polyesters of phthalic acid or adipic acid (e.g. Ultramoll ® I, II or III), and the highly technical production thereof, have been known for a long time. They are used in various known applications which are typical of plasticizers (e.g. calendered PVC films). Using these polymer plasticizers always creates problems, when more exacting requirements are made on plasticizers with regard to fogging, such as in the field of films for vehicles. The fogging nature of the monomer and polymer plasticizers used, particularly with PVC coats, which are produced after the slush-moulding process, still remains a problem for the automobile industry confronted with these requirements.

BRIEF DESCRIPTION OF THE INVENTION

It has now been found that when using polymer plasticizers in plastics, the fogging can almost be completely avoided and can only be observed to a minor extent, even under extreme conditions (e.g. effect of heat), if the polymer plasticizer is additionally treated with water vapor after the production process.

DETAILED DESCRIPTION OF THE INVENTION

An object of the invention is therefore a process for reducing the fogging when using polymer plasticizers in plastics, characterised in that the polymer plasticizer is treated with water vapor after the production process, preferably in the melt.

Polymer plasticizers treated in this way have shown a clear improvement in the quality of plasticizers known until now, with regard to fogging, and can help avoid coatings of fogging on the insides of car windows, which are undesirable from the point of view of driving safety.

Moreover the plasticizers treated according to the invention can be used for producing powder-slush compounds for example, as well as known areas of application.

According to the invention, all polymer plasticizers e.g. Ultramolls ® (e.g. Ultramoll ® I, II, III), polyesters such as polyadipate, polyphthalate etc can be pretreated.

When producing polyester plasticizers, e.g. polyadipic ester, a melt can be obtained, comprising a polycondensate of e.g. adipic ester and 1,3-butanol and/or 1,4-butanol and if necessary e.g. comprising adipic acid, 1,3-butanol and 1,4-hexanol and/or 1,6-hexanol. Table I after the examples, provides information on the characteristic grain sizes of such a polyadipate.

The polymer plasticizers treated according to the invention are appropriate preferably as plasticizers in plastics, which are used in producing films with little fogging, e.g. after a calendering and/or slush-moulding process.

According to the invention the polymer plasticizers are treated with water vapor (at a temperature up to 250° C.), after they have been produced. The water vapor is thereby preferably blown into the reactor with a nozzle, the polymer plasticizer being in the reactor, preferably in a molten form after its production. Volatile, low-molecular matter for example can thereby be removed from the reactor and if necessary condensed out separately.

EXAMPLES

The melt e.g. that of polyadipic ester shown in Table I, is treated for 20 hours or at least 15 hours with water vapor at a temperature of approximately 150° C.

By improving the distribution of the water vapor, e.g. by inserting a distributor nozzle, the time allowance can be considerably reduced, e.g. to 5 hours. The volatile, low-molecular matter can thereby be blown out of the polycondensation boiler and condensed out separately.

For a polyadipic ester, comprising adipic acid, 1,3-butandiol and 1,4-butandiol, the resultant end product (henceforth referred to as polyadipate I) shows the fogging values given in Table II compared to the fogging values of the same polyadipate before the treatment according to the invention (henceforth referred to as polyadipate II). The remaining numbers and properties of this polyadipate such as the mechanical properties of PVC mixtures (Table III), remain unchanged.

TABLE I

| Properties | Method of testing | Result | |
|---|---|---|---|
| Density d 50/4 | DIN 51 757 | g/cm$^3$ | 1 100–1 115 |
| Viscosity at 50° C. | DIN 53 015 | mPa.s | 2000–3000 |
| Refractive Index n$_D$ 20° C. | DIN 53 491 | — | 1 472–1 473 |
| Boiling point at 5 mbar | | °C. | not estimable |
| Flash point[1] | DIN ISO 2592 | °C. | 280–300 |
| Volatility 0–72 h/90° C. | Brabender | % | ≦1.0 |
| Volatility 48–72 h/90° C. | Brabender | % | ≦0.1 |
| Acid number | DIN 53 402 | mgKOH/1 g WM[2] | ≦1.0 |
| Saponification number | DIN 53 401 | mgKOH/1 g WM[2] | 510–540 |
| Hazen color | DIN 53 409 | — | ≦150 |
| Pour point | DIN 51 597 | °C. | ≦±01 |
| Water content | DIN 51 777 | % | ≦0.1 |
| Solvency temperature | DIN 53 408/B | °C. | 166 |

[1]in an open crucible
[2]WM = plasticizer

TABLE II

Fogging effect according to DIN 75 201 of a polyadipic ester before and after treatment with superheated water vapour (1500° C.)

| Fogging effect according to DIN 75 201 | After 6 h at 90° C. (%) | After 6 h at 120° C. (%) | After 6 h at 135° C. (%) |
| --- | --- | --- | --- |
| polyadipate I | 99 | 79 | 70 |
| polyadipate II | not measurable (0) | not measurable (0) | not measurable (0) |

TABLE III

Mechanical properties or PVR/polyadipate mixtures. Values measured on press plates, which were manufactured according to DIN 7749, Paper 2. Receiver: 70 parts S-PVC (K-value: 70); 30 parts polyadipate I or II, 1.5 parts Ba/Cd-laurate, 3 parts epoxylated soya bean oil.

| Type of Test | Measured in | Test Specification | Result |
| --- | --- | --- | --- |
| Tensile strength | MPa | DIN 53 455 | 26.1 |
| Tension at 100% elongation | MPa | DIN 53 455 | 15.5 |
| Breaking elongation | % | DIN 53 455 | 331 |
| Tear strength | kN/m | DIN 53 515 | 92 |
| Shore hardness A (15″) | | DIN 53 505 | 92 |
| Shore hardness D | | DIN 53 505 | 41 |
| Cold breaking point | °C. | DIN 53 372 | −14 |

We claim:

1. A process for reducing fogging when using polymer plasticizers in plastics which comprises treating a melt of a polymer plasticizer with water vapor.

2. Process according to claim 1 wherein the water vapor is superheated.

3. Process according to claim 1 wherein the water vapor is blown through a nozzle.

4. Process according to claim 1 wherein polyester plasticizers are used.

5. Process according to claim 1 wherein polyadipic esters are used.

6. Process according to claim 1 wherein polyphthalic esters are used.

7. Process according to claim 1 wherein the polymer plasticizer is used as a plasticizer in plastics.

8. Process according to claim 7 wherein the polymer plasticizer is used for producing powder-slush compounds.

9. Process according to claim 7 wherein the polymer plasticizer is used for producing PVC films.

* * * * *